United States Patent
Zheng et al.

(10) Patent No.: US 10,936,883 B2
(45) Date of Patent: Mar. 2, 2021

(54) ROAD REGION DETECTION

(71) Applicants: Harman International Industries, Incorporated, Stramford, CT (US); Wenming Zheng, Sipailou Nanjing (CN); Haitian Zhu, Sipailou Nanjing (CN); Zongcai Ruan, Sipailou Nanjing (CN); Yankun Zhang, Xuhui District (CN)

(72) Inventors: Wenming Zheng, Sipailou Nanjing (CN); Haitian Zhu, Sipailou Nanjing (CN); Zongcai Ruan, Sipailou Nanjing (CN); Yankun Zhang, Xuhui District (CN)

(73) Assignee: Harman International Industries, Incorporated, Stamford, CT (US)

( * ) Notice: Subject to any disclaimer, the term of this patent is extended or adjusted under 35 U.S.C. 154(b) by 1110 days.

(21) Appl. No.: 14/770,087

(22) PCT Filed: Mar. 1, 2013

(86) PCT No.: PCT/CN2013/072054
§ 371 (c)(1),
(2) Date: Aug. 24, 2015

(87) PCT Pub. No.: WO2014/131193
PCT Pub. Date: Sep. 4, 2014

(65) Prior Publication Data
US 2016/0004916 A1    Jan. 7, 2016

(51) Int. Cl.
*G06K 9/00* (2006.01)
*G06T 7/215* (2017.01)
*G06K 9/46* (2006.01)

(52) U.S. Cl.
CPC ..... *G06K 9/00798* (2013.01); *G06K 9/00791* (2013.01); *G06K 9/4604* (2013.01);
(Continued)

(58) Field of Classification Search
CPC ........... G06K 9/00798; G06K 9/00791; G06T 7/215; G06T 2207/30256; G06T 7/2086
(Continued)

(56) References Cited

U.S. PATENT DOCUMENTS

| 8,155,380 B2 | 4/2012 | Ma et al. | |
|---|---|---|---|
| 2010/0246901 A1* | 9/2010 | Yang | B60R 1/00 382/107 |
| 2011/0228101 A1* | 9/2011 | Miksch | H04N 17/002 348/175 |

FOREIGN PATENT DOCUMENTS

| CN | 101441076 A | 5/2009 |
|---|---|---|
| CN | 101868812 A | 10/2010 |

(Continued)

OTHER PUBLICATIONS

Extended European Search Report Application No. 13876448.5, dated Oct. 20, 2016, 10 pages.
(Continued)

*Primary Examiner* — Van D Huynh
(74) *Attorney, Agent, or Firm* — Artegis Law Group, LLP

(57) ABSTRACT

A road region detection method is provided. The method includes: obtaining a first image captured by a camera at a first time point and a second image captured by the camera at a second time point (S101), converting the first and second images into a first top view and a second top view, respectively (S103), obtaining a movement vector matrix which substantially represents movement of a road region relative to the camera between the first and second time points (S105), and determining whether a candidate point belongs to the road region by determining whether a position change of the candidate point between the first and second top views conforms to the movement vector matrix. The accuracy and efficiency may be improved.

15 Claims, 9 Drawing Sheets

(52) U.S. Cl.
CPC .... *G06T 7/215* (2017.01); *G06T 2207/10016* (2013.01); *G06T 2207/20164* (2013.01); *G06T 2207/30244* (2013.01); *G06T 2207/30256* (2013.01)

(58) Field of Classification Search
USPC ........................................................ 382/103
See application file for complete search history.

(56) References Cited

FOREIGN PATENT DOCUMENTS

| | | |
|---|---|---|
| CN | 101930609 A | 12/2010 |
| GB | 0516403 | 9/2005 |
| JP | 2003044996 A | 2/2003 |
| JP | 2006268076 A | 10/2006 |
| WO | 2007017693 A1 | 2/2007 |

OTHER PUBLICATIONS

Arrospide J. et al, "Homography-based ground plane detection using a single on-board camera", Jet Intelligent Transport Systems,,vol. 4, No. 2, Jun. 4, 2010 (Jun. 4, 2010), pp. 149-160, XP006035036, ISSN: 1751-9578, DOI: 10.1049/IET-ITS:20090073.
Jin Zhou et al. "Homography-based ground detection for a mobile robot platform using a single camera", 2006 IEEE International Conference on Robotics and Automation (ICRA) : Orlando, Florida, May 15-19, 2006, IEEE Operations Center, Piscataway, NJ, May 15, 2006 (May 15, 2006), pp. 4100-4105, XP010921894, ISBN: 978-0-7803-9505-3 * III. Homography based ground detection.
International Search Report Application No. PCT/CN2013/072054, dated Dec. 12, 2013.

\* cited by examiner

ROAD REGION DETECTION

CROSS-REFERENCE TO RELATED APPLICATIONS

The present application is a national stage application of international application number PCT/CN2013/072054 titled, "ROAD REGION DETECTION," filed on Mar. 1, 2013. The subject matter of this related application is hereby incorporated herein by reference.

TECHNICAL FIELD

The present disclosure generally relates to road region detection.

BACKGROUND

Nowadays, various image-based road detection methods have emerged in applications such as lane departure warning, autonomous driving, road environment understanding, and the like, in which Condition Random Field (CRF) models and Markov Random Field (MRF) models are widely applied. In such methods, a road region may be identified on an image, i.e., on pixel scale. Error rate of such methods is thus beyond acceptable. Therefore, a more robust method for detecting road regions is desired.

SUMMARY

According to one embodiment of the present disclosure, a method for detecting road regions is provided. The method may include: obtaining a first image captured by a camera at a first time point and a second image captured by the camera at a second time point; converting the first and second images into a first top view and a second top view, respectively; obtaining a movement vector matrix which substantially represents movement of a road region relative to the camera between the first and second time points; and determining whether a candidate point belongs to the road region by determining whether a position change of the candidate point between the first and second top views conforms to the movement vector matrix. The road region can be efficiently detected using the movement vector matrix as a criterion.

In some embodiments, the scale of the first and second top view image is substantially same to the real world. As a result, error rate may be reduced.

In some embodiments, the movement vector matrix may be obtained by: obtaining a rotation matrix $R_1$ and a translation matrix $T_1$ which substantially represent movement of the camera between the first and second time points; and obtaining the movement vector matrix, including a rotation matrix $R_2$ and a translation matrix $T_2$, based on $R_1$, $T_1$ and the camera's extrinsic parameters. There are various solutions for obtaining the rotation matrix and the translation matrix which represent the movement of the camera, which may include, for instance, feature points selecting and tracking, followed by fundamental matrix calculation and decomposition.

In some embodiments, if the camera's pitch angle $\alpha$ equals to zero, $R_2$ may equal to $-R_1$, and $T_2$ may equal to $-T_1$.

In some embodiments, if the camera's pitch angle $\alpha$ doesn't equal to zero, $R_2$ may equal to $-R_1$, and $T_2$ may equal to $$-\begin{pmatrix} \cos\alpha & 0 & 0 \\ 0 & 1 & 0 \\ 0 & 0 & \sin\alpha \end{pmatrix} * T_1.$$

In some embodiments, the movement vector matrix may be obtained by: identifying a group of feature points on the first top view; tracking the group of feature points on the second top view; and calculating the movement vector matrix, including the rotation matrix $R_2$ and the translation matrix $T_2$, by solving an objective function:

$$\operatorname*{argmin}_{R_2, T_2} \sum \{I_2(X_{T2}, Y_{T2}) - I_1[f(X_{T1}, Y_{T1})]\}^2,$$

where "argmin" stands for the argument of the minimum, that is to say, the group of feature points of the given argument for which the function $\Sigma\{I_2(X_{T2},Y_{T2})-I_1[f(X_{T1},Y_{T1})]\}^2$ attains its minimum value,
where $I_2(X_{T2},Y_{T2})$ stands for a set of coordinates indicating the position of a feature point on the second top view,
where $I_1[f(X_{T1},Y_{T1})]$ stands for a set of coordinates calculated based on Equation (1):

$$f(X_{T1}, Y_{T1}) = \begin{pmatrix} R_2 & T_2 \\ 0^T & 1 \end{pmatrix} \begin{pmatrix} X_{T1} \\ Y_{T1} \end{pmatrix}, \qquad \text{Equation (1)}$$

where $(X_{T1}, Y_{T1})$ stands for a set of coordinates indicating the position of the feature point on the first top view.

In some embodiments, determining whether the candidate point belongs to the road region may include: obtaining a first set of coordinates of the candidate point on the first top view; obtaining a second set of coordinates of the candidate point on the second top view; calculating a third set of coordinates using the first set of coordinates and the movement vector matrix; calculating a distance between the second set of coordinates and the third set of coordinates; and determining whether the candidate point belongs to the road region by determining whether the distance is less than a predetermined threshold value.

According to one embodiment of the present disclosure, a method for detecting road regions is provided. The method may include: obtaining a first image captured by a camera at a first time point and a second image captured by the camera at a second time point; converting the first and second images into a first top view and a second top view, respectively; obtaining a first movement vector matrix which substantially represents movement of the camera between the first and second time points; obtaining a second movement vector matrix which substantially represents movement of a road region relative to the camera between the first and second time points based on the first movement vector matrix and the camera's extrinsic parameters; obtaining a first set of coordinates of a candidate point on the first top view; obtaining a second set of coordinates of the candidate point on the second top view; calculating a third set of coordinates using the first set of coordinates and the movement vector matrix; calculating a distance between the second set of coordinates and the third set of coordinates; and determining whether the candidate point belongs to the road region by determining whether the distance is less than a predetermined threshold value.

According to one embodiment of the present disclosure, a system for detecting road regions is provided. The system may include a processing device configured to: obtain a first image captured by a camera at a first time point and a second image captured by the camera at a second time point; convert the first and second images into a first top view and a second top view, respectively; obtain a movement vector matrix which substantially represents movement of a road region relative to the camera between the first and second time points; and determine whether a candidate point belongs to the road region by determining whether a position change of the candidate point between the first and second top views conforms to the movement vector matrix. The road region can be efficiently detected using the movement vector matrix as a criterion.

In some embodiments, the scale of the first and second top view image is substantially same to the real world. As a result, error rate may be reduced.

In some embodiments, the processing device may be further configured to: obtain a rotation matrix $R_1$ and a translation matrix $T_1$ which substantially represent movement of the camera between the first and second time points; and obtain the movement vector matrix, including a rotation matrix $R_2$ and a translation matrix $T_2$, based on $R_1$, $T_1$ and the camera's extrinsic parameters.

In some embodiments, if the camera's pitch angle $\alpha$ equals to zero, $R_2$ may equal to $-R_1$, and $T_2$ may equal to $-T_1$.

In some embodiments, if the camera's pitch angle $\alpha$ doesn't equal to zero, $R_2$ may equal to $-R_1$, and $T_2$ may equal to $$-\begin{pmatrix} \cos\alpha & 0 & 0 \\ 0 & 1 & 0 \\ 0 & 0 & \sin\alpha \end{pmatrix} * T_1.$$

In some embodiments, the processing device may be configured to: identify a group of feature points on the first top view; track the group of feature points on the second top view; and calculate the movement vector matrix, including a rotation matrix $R_2$ and a translation matrix $T_2$, by solving an objective function:

$$\underset{R_2, T_2}{\operatorname{argmin}} \sum \{I_2(X_{T2}, Y_{T2}) - I_1[f(X_{T1}, Y_{T1})]\}^2,$$

where "argmin" stands for the argument of the minimum, that is to say, the group of feature points of the given argument for which the function $\Sigma\{I_2(X_{T2},Y_{T2})=I_1[f(X_{T1},Y_{T1})]\}^2$ attains its minimum value,
where $I_2(X_{T2},Y_{T2})$ stands for a set of coordinates indicating the position of a feature point on the second top view,
where $I_1[f(X_n,Y_n)]$ stands for a set of coordinates calculated based on Equation (1):

$$f(X_{T1}, Y_{T1}) = \begin{pmatrix} R_2 & T_2 \\ 0^T & 1 \end{pmatrix} \begin{pmatrix} X_{T1} \\ Y_{T1} \end{pmatrix}, \quad \text{Equation (1)}$$

where $(X_{T1}, Y_{T1})$ stands for a set of coordinates of the position of the feature point on the first top view.

In some embodiments, the processing device may be further configured to: obtain a first set of coordinates of the candidate point on the first top view; obtain a second set of coordinates of the candidate point on the second top view; calculate a third set of coordinates using the first set of coordinates and the movement vector matrix; calculate a distance between the second set of coordinates and the third set of coordinates; and determine whether the candidate point belongs to the road region by determining whether the distance is less than a predetermined threshold value.

According to one embodiment of the present disclosure, a non-transitory computer readable medium, which contains a computer program for detecting road regions, is provided. When the computer program is executed by a processor, it will instruct the processor to: obtain a first image captured by a camera at a first time point and a second image captured by the camera at a second time point; convert the first and second images into a first top view and a second top view, respectively; obtain a movement vector matrix which substantially represents movement of a road region relative to the camera between the first and second time points; and determine whether a candidate point belongs to the road region by determining whether a position change of the candidate point between the first and second top views conforms to the movement vector matrix.

According to one embodiment of the present disclosure, a system for detecting road regions is provided. The system may include: means for obtaining a first image captured by a camera at a first time point and a second image captured by the camera at a second time point; means for converting the first and second images into a first top view and a second top view, respectively; means for obtaining a movement vector matrix which substantially represents movement of a road region relative to the camera between the first and second time points; and means for determining whether a candidate point belongs to the road region by determining whether a position change of the candidate point between the first and second top views conforms to the movement vector matrix.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
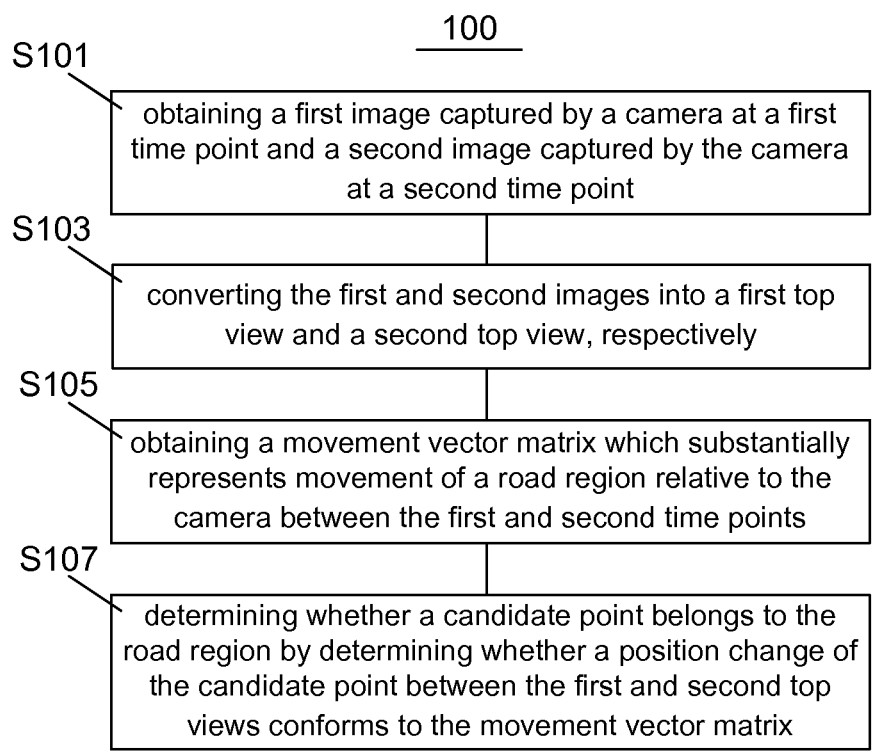
FIG. 1 schematically illustrates a method 100 for detecting road regions according to one embodiment of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

FIG. 1 schematically illustrates a method 100 for detecting road regions according to one embodiment of the present disclosure.

Referring to FIG. 1, in S101, obtaining a first image captured by a camera at a first time point and a second image captured by the camera at a second time point.

In some embodiments, the two images may be obtained from a frame sequence captured by the camera. In some embodiments, the two images may be two adjacent frames in the frame sequence. In some embodiments, the two images may be obtained in a predetermined time interval, for example, in every 1/30 second.

Figure 2A:
FIGS. 2A and 2B illustrate a first image and a second image, respectively.
Figure 2B:

FIGS. 2A and 2B illustrate a first image and a second image, respectively.

It is well known in the art that a world coordinate system, a camera coordinate system and an image coordinate system are established for a camera to capture images. Static objects, for example, a road region, in the real world may have fixed world coordinates, but its camera coordinates may change with the camera's movement. These changed camera coordinates may be converted into image coordinates based on a constant projection relationship merely related with the camera's fixed intrinsic parameters. As a result, the static objects may have different image coordinates, namely, appear on different positions in different images. It could be seen in FIGS. 2A and 2B that a road region is shown in both two figures, but a slight position change occurs, which may attribute to the movement of the camera.

In S103, converting the first and second images into a first top view and a second top view, respectively.

Converting an image captured by a camera into a top view is to project the image onto a simulated plane in the camera coordinate system, where, in some embodiments, the simulated plane may coincide with the actual road surface. Therefore, it may seem like the first and second images are projected onto the real road surface, forming two top views.

Figure 3:
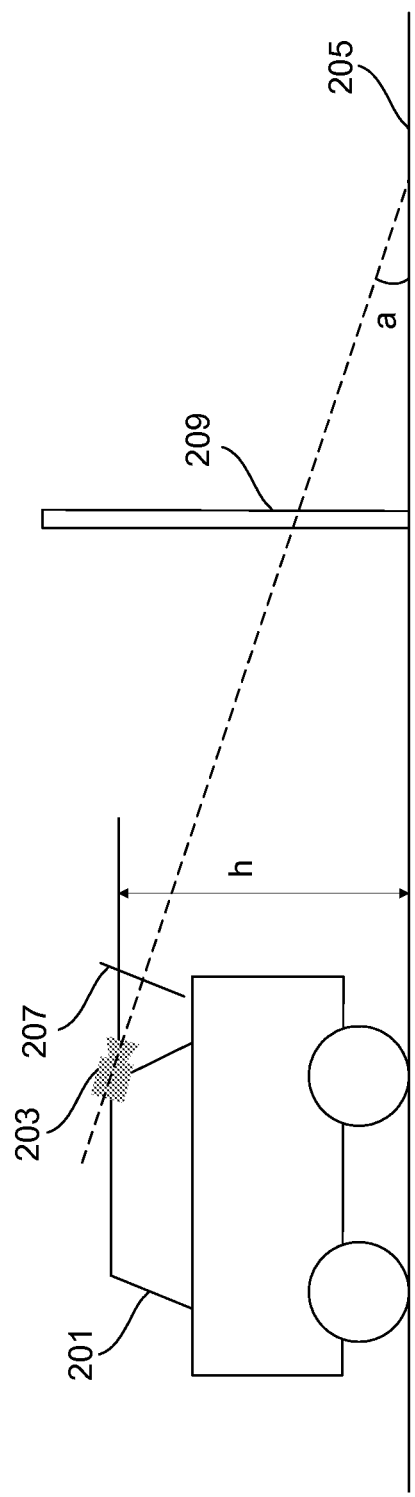
FIG. 3 schematically illustrates a vehicle on a road surface, with a camera.

FIG. 3 schematically illustrates a vehicle 201 having a camera 203 mounted thereon running on a road surface 205. The camera 203 has an installation height h and a pitch angle α, where the installation height may be a distance from the camera 203 to the road surface 205, and the pitch angle α may be an angle between the camera 203's optical axis (illustrated as a dotted line in FIG. 3) and the road surface 205. There is an obstacle 209 standing on the road surface 205 and in front of the vehicle 201. Part of the road surface 205 and the obstacle 209 may be projected onto the camera 203's image plane 207 based on extrinsic and intrinsic transformations.

Figure 4:
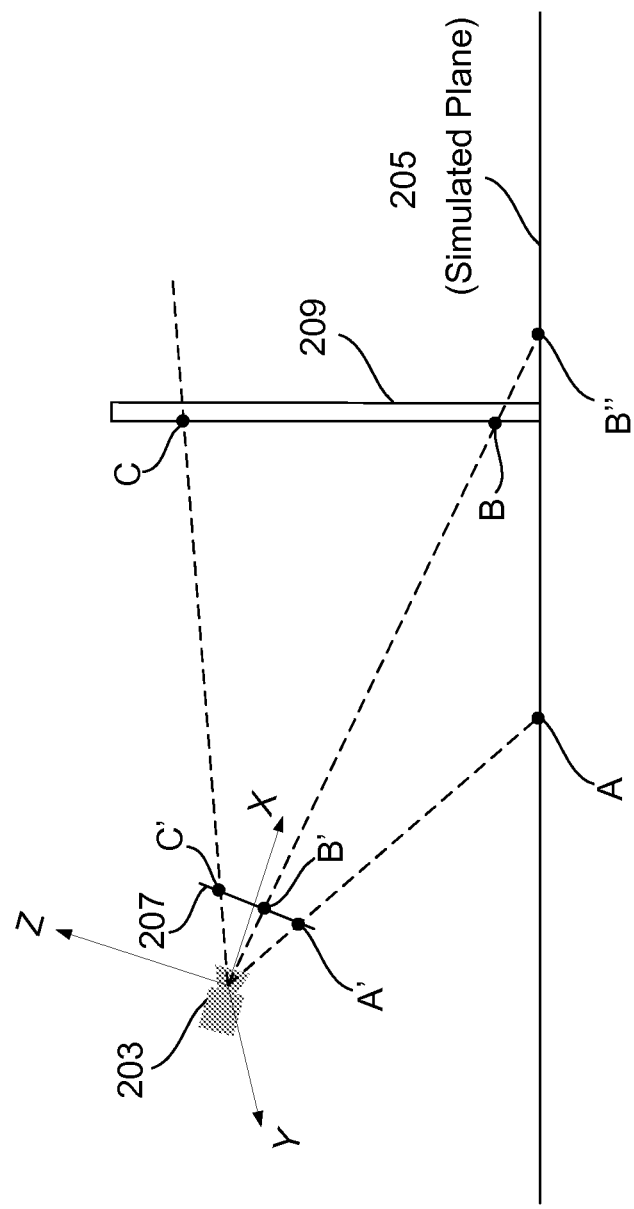
FIG. 4 schematically illustrates converting an image into a top view.

FIG. 4 schematically illustrates converting an image captured by the camera 203 into a top view.

Referring to FIG. 4, a camera coordinate system is established, which is well known in the art. Part of the road surface 205 and the obstacle 209 are shown on the image plane 207, i.e., on the image captured by the camera 203. For example, a point A on the road surface 205 may correspond to a pixel A' on the image. In some embodiments, when converting the image into the top view, the pixel A' may be projected onto a simulated plane which coincides with the road surface 205. Therefore, it may seem like the pixel A' is projected back onto the point A. For another example, a point B, above the road surface and on the obstacle 209, may correspond to a pixel B' on the image. However, when converting the image into the top view, the pixel B' may be projected onto a point B''. For another example, a point C, higher than the camera 203's optical center, may correspond to a pixel C' on the image. However, when converting the image into the top view, the pixel C' may not appear on the top view because its projection vector will not intersect with the simulated plane.

Figure 5A:
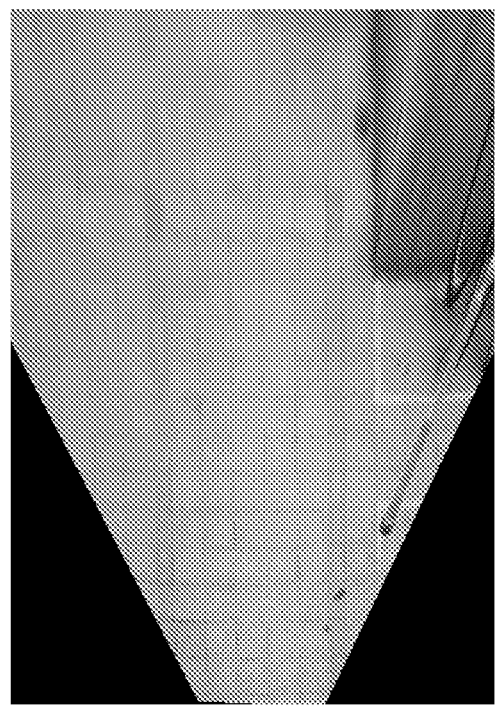
FIGS. 5A and 5B illustrate a first top view and a second top view, respectively, converted from FIGS. 2A and 2B.
Figure 5B:
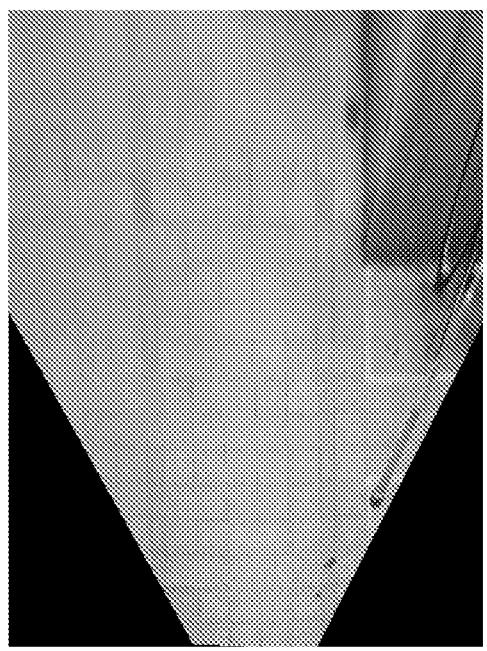

FIGS. 5A and 5B illustrate a first top view and a second top view, respectively, converted from FIGS. 2A and 2B.

It could be seen from FIGS. 5A and 5B that the road region may be ideally projected, while other objects are twisted or even disappear.

Specifically, suppose a static point in the real world has a set of world coordinates $$\begin{bmatrix} X_W \\ Y_W \\ Z_W \end{bmatrix},$$

the static point may have different sets of camera coordinates $$\begin{bmatrix} X_{C1} \\ Y_{C1} \\ Z_{C1} \end{bmatrix} \text{ and } \begin{bmatrix} X_{C2} \\ Y_{C2} \\ Z_{C2} \end{bmatrix}$$

after the extrinsic transformation with the camera's movement. Then, after the intrinsic transformation, on two images captured by the camera, the static point may have different sets of image coordinates $$\begin{bmatrix} X_{I1} \\ Y_{I1} \\ Z_{I1} \end{bmatrix} \text{ and } \begin{bmatrix} X_{I2} \\ Y_{I2} \\ Z_{I2} \end{bmatrix}.$$

If the two images are converted into two top views, the static point may have different sets of coordinates $$\begin{bmatrix} X_{T1} \\ Y_{T1} \\ Z_{T1} \end{bmatrix} \text{ and } \begin{bmatrix} X_{T2} \\ Y_{T2} \\ Z_{T2} \end{bmatrix}$$

on the two top views. According to the above descriptions referring to FIG. 4, it could be concluded that, $$\begin{bmatrix} X_{T1} \\ Y_{T1} \\ Z_{T1} \end{bmatrix} \text{ and } \begin{bmatrix} X_{T2} \\ Y_{T2} \\ Z_{T2} \end{bmatrix}$$

may equal to $$\begin{bmatrix} X_{C1} \\ Y_{C1} \\ Z_{C1} \end{bmatrix} \text{ and } \begin{bmatrix} X_{C2} \\ Y_{C2} \\ Z_{C2} \end{bmatrix}$$

when the static point is on the road surface, i.e., belongs to the road region.

There are several approaches existed for converting an image into a top view. In some embodiments, the first and second images may be respectively converted into the first and second top views based on Equation (1):

$$\begin{pmatrix} X_T \\ Y_T \\ Z_T \end{pmatrix} = H * \begin{pmatrix} X_I \\ Y_I \\ Z_I \end{pmatrix}, \quad \text{Equation (1)}$$

where $\begin{pmatrix} X_T \\ Y_T \\ Z_T \end{pmatrix}$ stands for a set of coordinates of a pixel on the top view, $$\begin{pmatrix} X_I \\ Y_I \\ Z_I \end{pmatrix}$$

stands for a set of image coordinates of a corresponding pixel on the image, H stands for a homography of the image plane to the simulated plane.

In some embodiments, the homography H may be obtained based on the camera's extrinsic and intrinsic parameters, including the camera's installation height, pitch angle and focus length. The installation height, pitch angle, and focus length of a camera may be fixed after the camera is installed. Therefore, the homography H may be calculated and stored in advance, and invoked when starting the road region detection.

In some embodiments, the homography H may be obtained using calibration board. By putting a calibration board on the road surface and capturing it when it is moving along the road surface, a homography $H_1$ standing for the projection from the road surface to the image plane may be easily obtained. As illustrated above, in some embodiments, the simulated plane in the camera system may coincide with the real road surface, and homography matrices are invertible, thus the homography H may equal to $H_1^{-1}$.

In S105, obtaining a movement vector matrix which substantially represents movement of a road region relative to the camera between the first and second time points.

Since the camera may move between the first and second time points, the road region in the real world, although motionless, may have a movement relative to the camera, i.e., a point on the road region may have two sets of camera coordinates respectively at the first and second time points. Therefore, the movement vector matrix may be a matrix standing for the transformation between the two sets of camera coordinates.

Furthermore, as illustrated above, the coordinates $$\begin{bmatrix} X_{T1} \\ Y_{T1} \\ Z_{T1} \end{bmatrix} \text{ and } \begin{bmatrix} X_{T2} \\ Y_{T2} \\ Z_{T2} \end{bmatrix}$$

of a point on the first and second top views may respectively equal to the camera coordinates $$\begin{bmatrix} X_{C1} \\ Y_{C1} \\ Z_{C1} \end{bmatrix} \text{ and } \begin{bmatrix} X_{C2} \\ Y_{C2} \\ Z_{C2} \end{bmatrix}$$

of the point when the point belongs to the road region. Therefore, the movement vector matrix may be used as a criterion for road region detection on the top views.

In some embodiments, the movement vector matrix may be obtained based on movement of the camera and the camera's extrinsic parameters.

Specifically, in some embodiments, the movement vector matrix may be obtained as follows:

First, selecting feature points on the first image.

Figure 6A:
FIG. 6A illustrates feature points selected on the first image.

FIG. 6A illustrates feature points selected on the first image. In some embodiments, a Harris corner detector may be used to select the feature points in the first image for the rotation invariant and geometric scale invariant characteristics thereof.

Thereafter, tracking the corresponding feature points on the second image.

Figure 6B:
FIG. 6B illustrates corresponding feature points identified on the second image.
Figure 6C:
FIG. 6C illustrates optical flows of the feature points.

FIG. 6B illustrates corresponding feature points tracked on the second image. A point on one of the two images corresponding to a point on the other image means the two points represent the same point in the real world. In some embodiments, a KLT optical flow tracker may be used to track the feature points on the first image and identify the corresponding feature points on the second image. FIG. 6C illustrates optical flows of the feature points.

Thereafter, calculating a fundamental matrix F based on the feature points and the corresponding feature points.

The fundamental matrix F stands for a position change of the feature points between the first and second images. The fundamental matrix F may be calculated base on Equation (3):

$$X'^T * F * X = 0 \quad \text{Equation (2),}$$

where X is a matrix representing positions of the feature points on the first image, X' is a matrix representing positions of the corresponding feature points on the second image and $X'^T$ is a transpose of X'. In some embodiments, the fundamental matrix F may be calculated using Random Sample Consensus (RANSAC).

Thereafter, obtaining a translation matrix $T_1$ and a rotation matrix $R_1$ based on singular value decomposition (SVD) of the fundamental matrix F. SVD is well known to those skilled in the art and will not be described in detail here.

The translation matrix $T_1$ and the rotation matrix $R_1$ may represent the camera's movement in the 3D real world from the first time point to the second time point.

Thereafter, obtaining the movement vector matrix based on $T_1$, $R_1$ and the camera's extrinsic parameters.

Hereunder, influence of $T_1$, $R_1$ and the camera's extrinsic parameters on the movement vector matrix will be illustrated.

In some occasions, the camera may be mounted such that the optical axis thereof is in parallel with the road surface, i.e., the pitch angle α of the camera equals to zero. Since the camera may be mounted on a vehicle and move with the vehicle, the camera's movement is normally in parallel with the road surface. Therefore, the movement of a point on the road region from the first time point to the second time point may be taken as just opposite to the camera's movement. Therefore, if the camera's pitch angle α equals to zero, the movement vector matrix may also including a rotation matrix $R_2$ and a translation matrix $T_2$, where $R_2$ may equal to $-R_1$, and $T_2$ may equal to $-T_1$.

In some occasions, the camera's optical axis may not be in parallel with the road surface, i.e., the pitch angle α of the camera doesn't equal to zero. It could be understood that the rotation of the road region from the first time point to the second time point is still opposite to the rotation of the camera. However, the translation of the road region may not be opposite to the translation of the camera.

The translation matrix $T_1$ of the camera may be represented as $$\begin{bmatrix} \Delta X \\ \Delta Y \\ \Delta Z \end{bmatrix},$$

where $\Delta X$, $\Delta Y$ and $\Delta Z$ represent translations of the camera along X, Y and Z axes in the world coordinate system from the first time point to the second time point. And the translation matrix $T_2$ of the road region may be represented as $$\begin{bmatrix} \Delta X_C \\ \Delta Y_C \\ \Delta Z_C \end{bmatrix},$$

where $\Delta X_C$, $\Delta Y_C$ and $\Delta Z_C$ represent translations of the road region along X, Y and Z axes in the camera coordinate system from the first time point to the second time point. Hereunder, the translation of the road region will be analyzed.

Regarding influence of $\Delta Z$, since normally the camera may move in parallel with the road surface, $\Delta Z$ may equal to zero or a minimal value. Therefore, in some embodiments, the influence of $\Delta Z$ on the movement vector matrix may be ignored.

Regarding influence of $\Delta Y$, since Y axes of the camera coordinate system and the world coordinate system are parallel, in some embodiments, $\Delta Y_C$ may equal to $-\Delta Y$.

Figure 7:
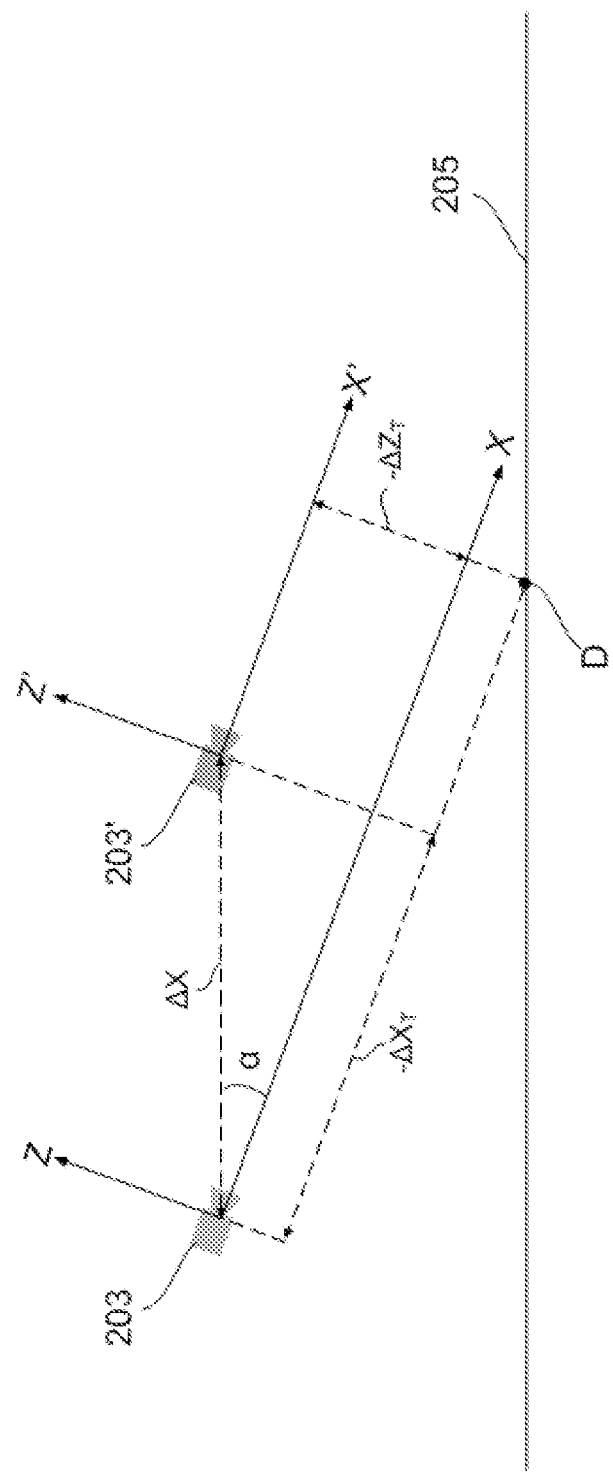
FIG. 7 schematically illustrates a position change of a point relative to the camera due to the camera's translation.

Regarding influence of $\Delta X$, FIG. 7 schematically illustrates changes of a point's X and Z camera coordinates due to the camera's translation along X axis in the world coordinate system. Referring to FIG. 7, it could be concluded that $\Delta X_C$ may equal to $-\cos α * \Delta X$, and $\Delta Z_C$ may equal to $-\sin α * \Delta X$.

Therefore, in some embodiments, if the pitch angle α doesn't equal to zero, the rotation matrix $R_2$ may still equal to $-R_1$, while the translation matrix $T_2$ may be obtained based on Equation (3):

$$T_2 = \begin{bmatrix} \Delta X_C \\ \Delta Y_C \\ \Delta Z_C \end{bmatrix} = \begin{bmatrix} -\cos α * \Delta X \\ -\Delta Y \\ -\sin α * \Delta X \end{bmatrix} = -\begin{pmatrix} \cos α & 0 & 0 \\ 0 & 1 & 0 \\ 0 & 0 & \sin α \end{pmatrix} * T_1. \quad \text{Equation (3)}$$

Above described are embodiments in which the movement vector matrix may be obtained based on the camera's movement and extrinsic parameters, which are not intended to limit the scope of the present disclosure. In some embodiments, the movement vector matrix may be obtained using an "argmin" function.

Specifically, the movement vector matrix may be obtained by: identifying a group of feature points on the first top view; tracking the group of feature points on the second top view; and calculating the rotation matrix $R_2$ and the translation matrix $T_2$ by solving an objective function:

$$\underset{R_2, T_2}{\mathrm{argmin}} \sum \{I_2(X_{T2}, Y_{T2}) - I_1[f(X_{T1}, Y_{T1})]\}^2 \quad \text{objective function},$$

where "argmin" stands for the argument of the minimum, that is to say, the group of feature points of the given argument for which the function $\Sigma\{I_2(X_{T2},Y_{T2})-I_1[f(X_{T1},Y_{T1})]\}^2$ attains its minimum value, where $I_2(X_{T2},Y_{T2})$ stands for a set of coordinates of a feature point on the second top view, where $I_1[f(X_{T1},Y_{T1})]$ stands for a set of coordinates calculated based on Equation (4):

$$f(X_{T1}, Y_{T1}) = \begin{pmatrix} R_2 & T_2 \\ 0^T & 1 \end{pmatrix} \begin{pmatrix} X_{T1} \\ Y_{T1} \end{pmatrix}, \quad \text{Equation (4)}$$

where $(X_{T1}, Y_{T1})$ stands for a set of coordinates indicating the position of the feature point on the first top view.

Since the points which belong to the road region may have coordinates on the first and second top views same as their camera coordinates at the first and second time points, and normally the feature points selected may mostly belong to the road region, $R_2$ and $T_2$ solved from the "argmin" function may approximately represent the movement of the road region.

In S107, determining whether a candidate point belongs to the road region by determining whether a position change of the candidate point between the first and second top views conforms to the movement vector matrix. The road region can be efficiently detected using the movement vector matrix as a criterion.

As described above, the points which belong to the road region may have coordinates $$\begin{bmatrix} X_{T1} \\ Y_{T1} \\ Z_{T1} \end{bmatrix} \text{ and } \begin{bmatrix} X_{T2} \\ Y_{T2} \\ Z_{T2} \end{bmatrix}$$

on the top views equaling to their camera coordinates $$\begin{bmatrix} X_{C1} \\ Y_{C1} \\ Z_{C1} \end{bmatrix} \text{ and } \begin{bmatrix} X_{C2} \\ Y_{C2} \\ Z_{C2} \end{bmatrix},$$

while other points may not. Therefore, the points which belong to the road region may confirm to the movement vector matrix, while other points may not.

In some embodiments, determining whether the candidate point belongs to the road region may include: obtaining a first set of coordinates of the candidate point on the first top view; obtaining a second set of coordinates of the candidate point on the second top view; calculating a third set of coordinates using the first set of coordinates and the movement vector matrix; calculating a distance between the second set of coordinates and the third set of coordinates; and determining whether the candidate point belongs to the road region by determining whether the distance is less than a predetermined threshold value.

In some embodiments, the threshold value may be selected in the range from about 15 centimeters to 25 centimeters. The range of the threshold value may be re-set based on parameters of the camera and the acceptable error ratio.

Figure 8:
FIG. 8 illustrates a road region detected.

FIG. 8 illustrates the road region detected.

In the above described method, images are converted into top views. The scale of the top views is substantially same as or close to the real world. Since the determination is performed based on the top views, the threshold value may be selected on centimeter scale, which may allow a relatively large selecting window and thus improve the robustness.

Figure 9:
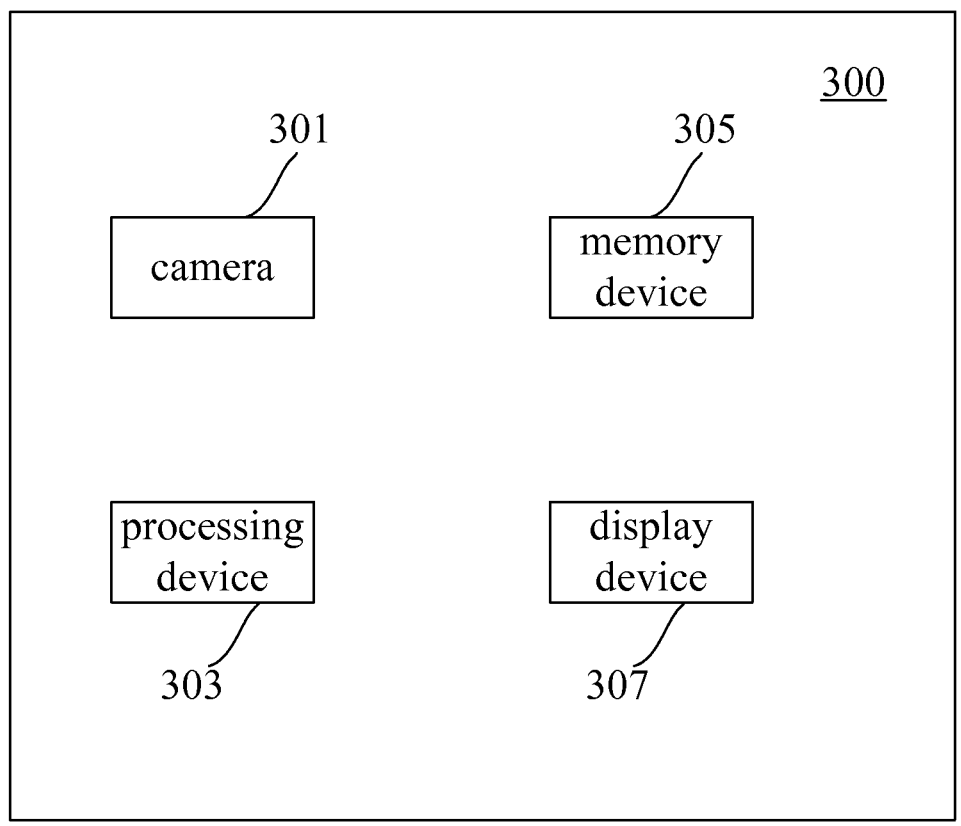
FIG. 9 schematically illustrates a system 300 for detecting road regions according to one embodiment of the present disclosure.

FIG. 9 schematically illustrates a system 300 for detecting road regions according to one embodiment of the present disclosure. The system 300 includes a camera 301, a processing device 303, a memory device 305 and a display device 307. The system 300 may be mounted on a vehicle, a detector, or the like.

The camera 301 is configured to capture images. The processing device 403 may be configured to conduct S101 to S107 of the method 100. The memory device 305 may store an operating system and program instructions. In some embodiments, the memory device 305 may store a homography for conducting S103. The display device 307 is configured to display a road region detected.

According to one embodiment of the present disclosure, a non-transitory computer readable medium, which contains a computer program for detecting road regions, is provided. When the computer program is executed by a processor, it will instruct the processor to implementing S101 to S107 of the method 100 for detecting road regions.

There is little distinction left between hardware and software implementations of aspects of systems; the use of hardware or software is generally a design choice representing cost vs. efficiency tradeoffs. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for detecting road regions, comprising:
obtaining a first image captured by a camera at a first time point and a second image captured by the camera at a second time point;
converting the first image and the second image into a first top view and a second top view, respectively;
obtaining a movement vector matrix which substantially represents movement of a road region relative to the camera between the first time point and the second time point; and
determining whether a candidate point belongs to the road region by determining whether a position change of the candidate point between the first top view and the second top view conforms to the movement vector matrix.

2. The method according to claim 1, wherein a scale of the first top view and the second top view is substantially similar to a real-world scale.

3. The method according to claim 1, wherein the movement vector matrix is obtained by:
obtaining a rotation matrix $R_1$ and a translation matrix $T_1$ which substantially represent movement of the camera between the first time point and the second time point; and
obtaining the movement vector matrix, comprising a rotation matrix $R_2$ and a translation matrix $T_2$, based on $R_1$, $T_1$, and one or more extrinsic parameters of the camera.

4. The method according to claim 3, wherein, if the camera's pitch angle $\alpha$ equals to zero, then $R_2$ equals $-R_1$, and $T_2$ equals $-T_1$.

5. The method according to claim 3, wherein, if the camera's pitch angle $\alpha$ does not equal to zero, then $R_2$ equals $-R_1$, and $T_2$ equals $$-\begin{pmatrix} \cos\alpha & 0 & 0 \\ 0 & 1 & 0 \\ 0 & 0 & \sin\alpha \end{pmatrix} * T_1.$$

6. The method according to claim 1, wherein the movement vector matrix is obtained by:
Identifying a group of feature points on the first top view;
tracking the feature points on the second top view; and
calculating $R_2$ and $T_2$ by solving an objective function:

$$\underset{R_2, T_2}{\operatorname{argmin}} \sum \{I_2(X_{T2}, Y_{T2}) - I_1[f(X_{T1}, Y_{T1})]\}^2,$$

where argmin defines a group of feature points of an argument for which the function $\Sigma\{I_2(X_{T2}, Y_{T2}) - I_1[f(X_{T1}, Y_{T1})]\}^2$ attains a minimum value,
where $I_2(X_{T2}, Y_{T2})$ defines a set of coordinates indicating the position of a feature point on the second top view,
where $I_1[f(X_{T1}, Y_{T1})]$ defines a set of coordinates calculated based on:

$$f(X_{T1}, Y_{T1}) = \begin{pmatrix} R_2 & T_2 \\ 0^T & 1 \end{pmatrix} \begin{pmatrix} X_{T1} \\ Y_{T1} \end{pmatrix},$$

where $\begin{pmatrix} X_{T1} \\ Y_{T1} \end{pmatrix}$ defines a set of coordinates indicating the position of the feature point on the first top view.

7. The method according to claim 1, wherein determining whether a candidate point belongs to the road region comprises:

obtaining a first set of coordinates of the candidate point on the first top view;

obtaining a second set of coordinates of the candidate point on the second top view;

calculating a third set of coordinates using the first set of coordinates and the movement vector matrix;

calculating a distance between the second set of coordinates and the third set of coordinates; and determining whether the candidate point belongs to the road region by determining whether the distance is less than a predetermined threshold value.

8. A system for detecting road regions, comprising:

a processing device configured to:

obtain a first image captured by a camera at a first time point and a second image captured by the camera at a second time point;

convert the first image and the second image into a first top view and a second top view, respectively;

obtain a movement vector matrix which substantially represents movement of a road region relative to the camera between the first time point and the second time point; and determine whether a candidate point belongs to the road region by determining whether a position change of the candidate point between the first top view and the second top view conforms to the movement vector matrix.

9. The system according to claim 8, wherein a scale of the first top view and the second top view is substantially similar to a real-world scale.

10. The system according to claim 8, wherein the processing device is further configured to:

obtain a rotation matrix $R_1$ and a translation matrix $T_1$ which substantially represent movement of the camera between the first time point and the second time point; and obtain the movement vector matrix, comprising a rotation matrix $R_2$ and a translation matrix $T_2$, based on $R_1$, $T_1$, and one or more extrinsic parameters of the camera.

11. The system according to claim 10, wherein, if the camera's pitch angle $\alpha$ equals to zero, then $R_2$ equals $-R_1$, and $T_2$ equals $-T_1$.

12. The system according to claim 10, wherein, if the camera's pitch angle $\alpha$ does not equal to zero, then $R_2$ equals $-R_1$, and $T_2$ equals $$-\begin{pmatrix} \cos\alpha & 0 & 0 \\ 0 & 1 & 0 \\ 0 & 0 & \sin\alpha \end{pmatrix} * T_1.$$

13. The system according to claim 8, wherein the processing device is further configured to:

Identify a group of feature points on the first top view;

track the feature points on the second top view; and calculate $R_2$ and $T_2$ by solving an objective function:

$$\operatorname*{argmin}_{R_2,T_2} \sum \{I_2(X_{T2}, Y_{T2}) - I_1[f(X_{T1}, Y_{T1})]\}^2,$$

where argmin defines a group of feature points of an argument for which the function $\Sigma\{I_2(X_{T2},Y_{T2})-I_1[f(X_{T1},Y_{T1})]\}^2$ attains a minimum value, where $I_2(X_{T2},Y_{T2})$ defines a set of coordinates indicating the position of a feature point on the second top view, where $I_1[f(X_{T1},Y_{T1})]$ defines a set of coordinates calculated based on:

$$f(X_{T1}, Y_{T1}) = \begin{pmatrix} R_2 & T_2 \\ 0^T & 1 \end{pmatrix} \begin{pmatrix} X_{T1} \\ Y_{T1} \end{pmatrix},$$

where $\begin{pmatrix} X_{T1} \\ Y_{T1} \end{pmatrix}$ defines a set of coordinates indicating the position of the feature point on the first top view.

14. The system according to claim 8, wherein the processing device is further configured to:

obtain a first set of coordinates of the candidate point on the first top view;

obtain a second set of coordinates of the candidate point on the second top view;

calculate a third set of coordinates using the first set of coordinates and the movement vector matrix;

calculate a distance between the second set of coordinates and the third set of coordinates; and determine whether the candidate point belongs to the road region by determining whether the distance is less than a predetermined threshold value.

15. A system for detecting road regions, comprising:

means for obtaining a first image captured by a camera at a first time point and a second image captured by the camera at a second time point;

means for converting the first image and the second image into a first top view and a second top view, respectively;

means for obtaining a movement vector matrix which substantially represents movement of a road region relative to the camera between the first time point and the second time point; and means for determining whether a candidate point belongs to the road region by determining whether a position change of the candidate point between the first top view and the second top view conforms to the movement vector matrix.

* * * * *